(12) United States Patent
Lee

(10) Patent No.: US 12,430,018 B2
(45) Date of Patent: Sep. 30, 2025

(54) CUSTOMIZABLE BORDER AREAS FOR TOUCH CONTROL OPERATIONS

(71) Applicants: Futaijing Precision Electronics (Yantai) Co., Ltd., Yantai (CN); HON HAI PRECISION INDUSTRY CO., LTD., New Taipei (TW)

(72) Inventor: Szu-Ting Lee, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 181 days.

(21) Appl. No.: 18/373,571

(22) Filed: Sep. 27, 2023

(65) Prior Publication Data
US 2024/0295957 A1    Sep. 5, 2024

(30) Foreign Application Priority Data
Mar. 3, 2023    (CN) .......................... 202310224547.9

(51) Int. Cl.
G06F 3/04847    (2022.01)
G06F 3/042      (2006.01)
G06F 3/0488     (2022.01)

(52) U.S. Cl.
CPC ........ *G06F 3/04847* (2013.01); *G06F 3/0428* (2013.01); *G06F 3/0488* (2013.01)

(58) Field of Classification Search
None
See application file for complete search history.

(56) References Cited

U.S. PATENT DOCUMENTS

| | | | | |
|---|---|---|---|---|
| 2009/0167559 A1* | 7/2009 | Gaddy | ................. | G08G 1/0962 340/901 |
| 2014/0137042 A1* | 5/2014 | Du | ...................... | G06F 3/04886 715/834 |
| 2015/0154781 A1* | 6/2015 | Takanashi | ........... | G06F 3/04883 345/173 |

FOREIGN PATENT DOCUMENTS

| | | |
|---|---|---|
| CN | 105657173 | 6/2016 |
| CN | 111273989 | 6/2020 |
| CN | 111459382 | 7/2020 |
| CN | 111459382 A * | 7/2020 |

OTHER PUBLICATIONS

Shangguan, Xin-yang et al. (CN 111459382 A), Abstract and figs. 3, 7, and 10a-b. Machine Transalation and Original Merged. (Year: 2020).*

* cited by examiner

*Primary Examiner* — Gabriel Mercado
(74) *Attorney, Agent, or Firm* — ScienBiziP, P.C.

(57) ABSTRACT

A device control method implementing to blindly operate an electronic device through a border, comprises determining a control function corresponding to a first border area of the electronic device in response to the first border area receiving a first touch operation, outputting a prompt tone corresponding to the control function, obtaining operation information of the first touch operation, and performing a control task of the control function based on the operation information. The electronic device and a computer storage medium are also provided.

11 Claims, 11 Drawing Sheets

CUSTOMIZABLE BORDER AREAS FOR TOUCH CONTROL OPERATIONS

TECHNICAL FIELD

The subject matter herein generally relates to control technology of electronic devices.

BACKGROUND

With the development of display technology, more and more devices interact with users through touch screens. Taking electric vehicles as an example, compared with fuel vehicles, physical buttons/knobs of a center console are visibly reduced, and multiple functions (such as air-conditioner control, multimedia control, windows control, etc.) are controlled through a center control screen. Because of a process of user operation of the central control screen is highly dependent on eyes, it may take more time to complete a control task than a traditional physical button/knob, and for the driver, the longer the distraction, the greater the possibility of danger.

BRIEF DESCRIPTION OF THE DRAWINGS

Implementations of the present technology will now be described, by way of example only, with reference to the attached figures.

DETAILED DESCRIPTION

Figure 1:
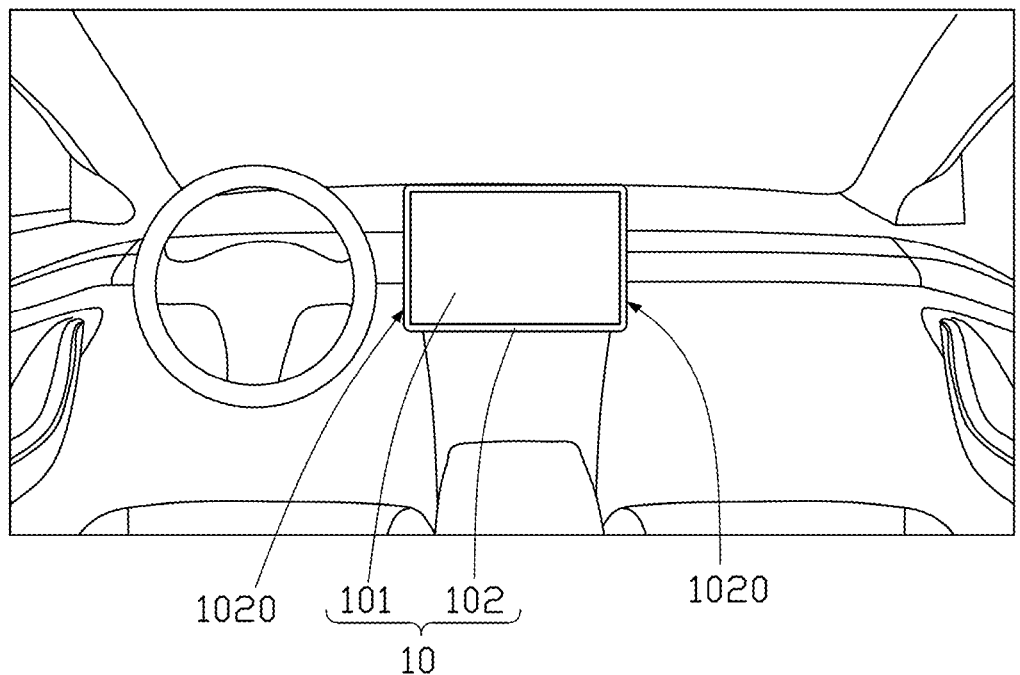
FIG. 1 is an application scenario diagram of an embodiment of a device control method according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present application refers to a device control method, the device control method can be applied to an electronic device, the electronic device can be mobile phones, tablets, vehicle screens (for example, a central control device of a vehicle), etc.

FIG. 1 illustrates one exemplary embodiment of an application scenario of the device control method. The application scenario is illustrated by a vehicle as an example, the vehicle comprises a central control screen 10, and the central control screen 10 can communicate with a vehicle control system of the vehicle. The center control screen 10 comprises a display area 101 and a border 102. The central control screen 10 may be a touch screen supporting touch operation, the vehicle control system can perform a control function corresponding to a touch operation received by the display area 101. For example, control functions may comprise screen brightness adjustment, multimedia control, air-conditioner control, window control, sunroof control, etc.

In one embodiment, the border 102 comprises multiple border areas 1020 supporting touch operation. For example, a pressure sensor is set in each of the multiple border areas 1020 to detect a touch operation of a driver or a passenger. Each of the multiple border areas 1020 may also be provided with other sensors that can detect the touch operation of the driver or the passenger, and the present application does not limit a type of the sensor. The vehicle control system can perform a control function corresponding to a touch operation received by each of the multiple border areas 1020, to achieve an effect of blind operation through the border areas 1020 and reduce a driving risk caused by a distraction operation screen of the driver.

Figure 2A:
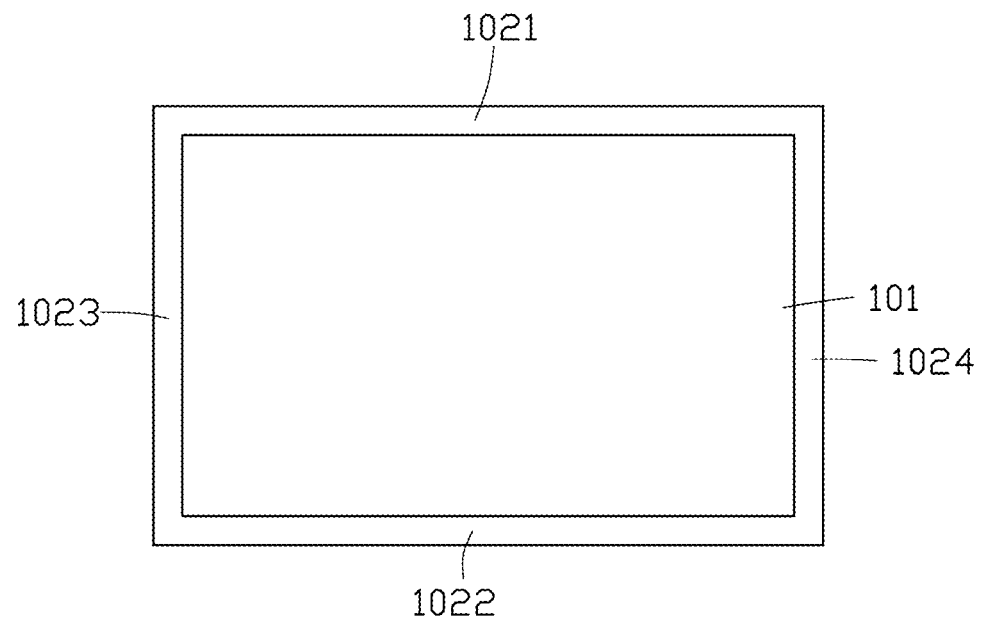
FIGS. 2A and 2B are schematic structural diagrams of an embodiment of border areas of an electronic device according to the present disclosure.

Referring to FIG. 2A, the border areas 1020 may comprise front areas of the border 102. The front areas of the border 102 may comprise at least one of an upper border area 1021, a lower border area 1022, a left border area 1023, and a right border area 1024.

Figure 2B:
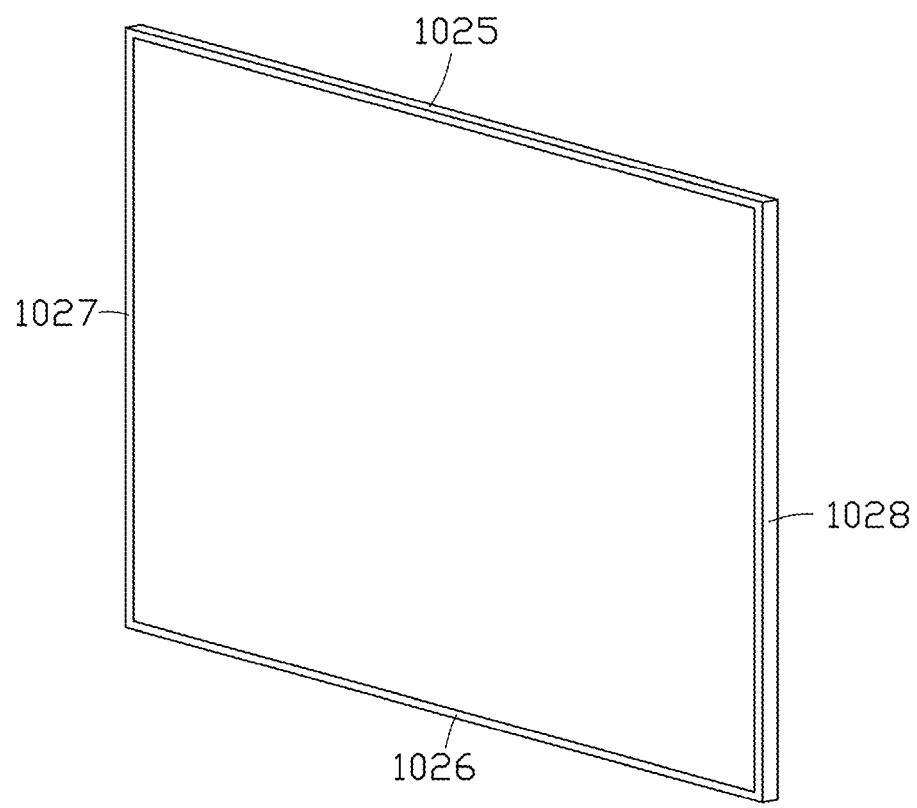

Referring to FIG. 2B, the border areas 1020 may comprise side edge areas of the border 102. The side edge areas of the border 102 may comprise at least one of an upper side edge area 1025, a lower side edge area 1026, a left side edge area 1027, and a right side edge area 1028.

In one embodiment, the vehicle control system can divide and merge function areas of the border areas 1020, and set a control function and a prompt tone for each of the border areas 1020 according to touch operations of a user (for example, the driver or the passenger). The prompt tone may be a sound playing a name of the control function, or other specified short sound (for example, a short sound of "ding-ding"), the present application does not limit a type of the prompt tone.

Figure 3:
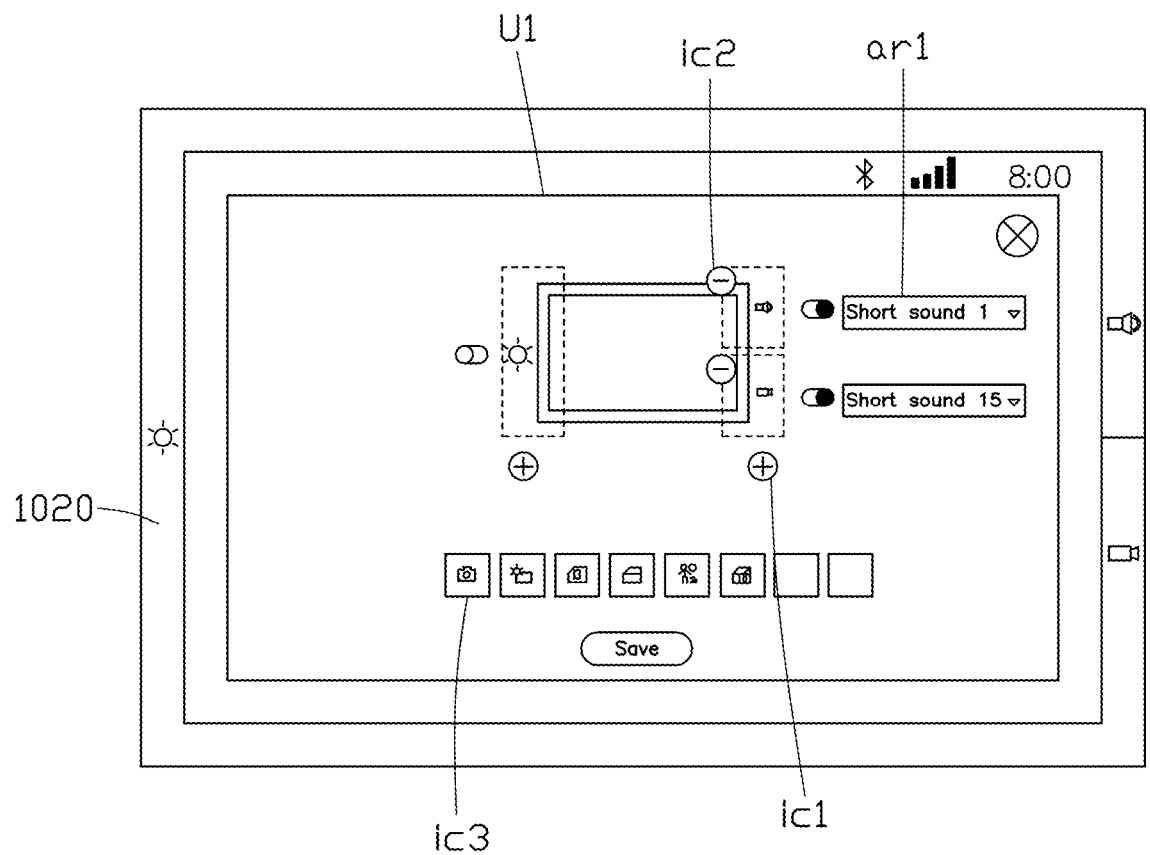
FIG. 3 is a schematic diagram of an embodiment of a border function setting interface according to the present disclosure.

Referring to FIG. 3, the central control screen 10 can open a border function setting interface U1 in response to the display area 101 receiving a touch operation. The border function setting interface U1 is configured to set a control function and a prompt tone for each of the border areas 1020. For example, the prompt tone corresponding to the control function can be set in a sound setting area ar1.

In one embodiment, each of the border areas 1020 can be divided into one or more sub-border areas, the sub-border areas can be called functional areas. Each of the sub-border areas may correspond to a control function. For example, the user can click a plus icon ic1 to add a new function area for a border area 1020, and click a minus icon ic2 to delete a functional area for a border area 1020. For each functional area, a sound switch icon is set accordingly. If the sound switch icon of a functional area is turned on, the user can set a prompt tone for the function area according to an actual requirement.

In one embodiment, two sub-border areas can also be set to the same control function. For example, a control function corresponding to one sub-border area is to increase a brightness of the central control screen 10, and a control function corresponding to the other sub-border area is to decrease brightness of the central control screen 10; or the control function corresponding to the one sub-border area is to increase a volume of a multimedia, and the control function corresponding to the other sub-border area is to decrease the volume of the multimedia.

The border function setting interface U1 can display a number of selectable icons IC3 of control functions. The selectable icons IC3 of control functions can be pre-defined during a user experience design, and the control functions provided by the border function setting interface U1 will not affect a driving safety of the vehicle if the user accidentally touches a control function. For example, the control functions provided by the border function setting interface U1 may comprise a screen brightness adjustment function, a volume adjustment function, a photo taking function, a video recording function, an interior light control function, a window switch function, a window locking function, an air-conditioner control function, a sunroof control function, etc.

Figure 4A:
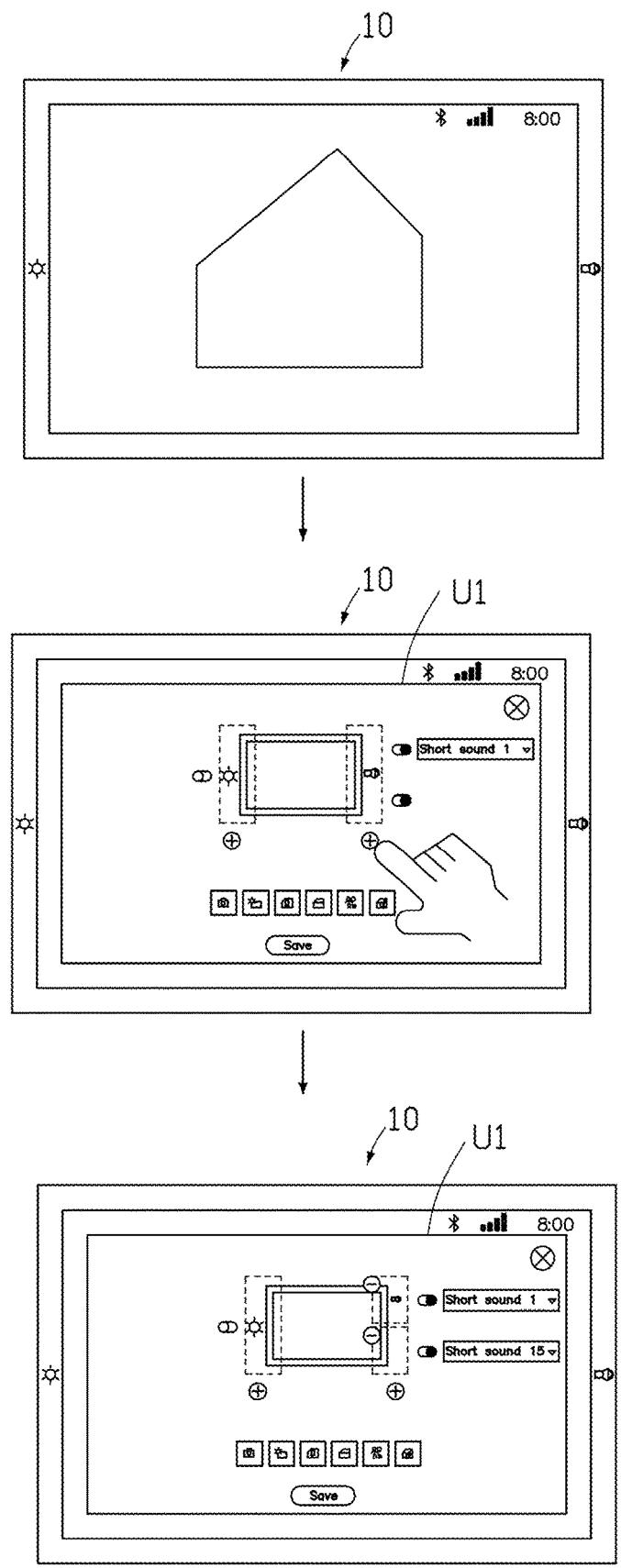
FIGS. 4A and 4B are operation diagrams of an embodiment of setting control functions for the border areas of the electronic device according to the present disclosure.

Referring to FIG. 4A, in an initial state, the left border area is configured to adjust a screen brightness, and the right border area is configured to adjust a multimedia volume. The central control screen 10 may open the border function setting interface U1 based on a touch operation received by the display area 101. Supposing the user expects to add a control function to the right border area, the user can click a plus icon corresponding to the right border area, to increase a functional area for the right border area, and the functional areas of the right border area is changed from containing one functional area to containing two functional areas. That is, the right border area is divided into two sub-border areas, and the two sub-border areas can evenly divide the right border area. For example, an upper half of the right border area is set as one sub-border area, and a lower half of the right border area is set as the other sub-border area.

Figure 4B:
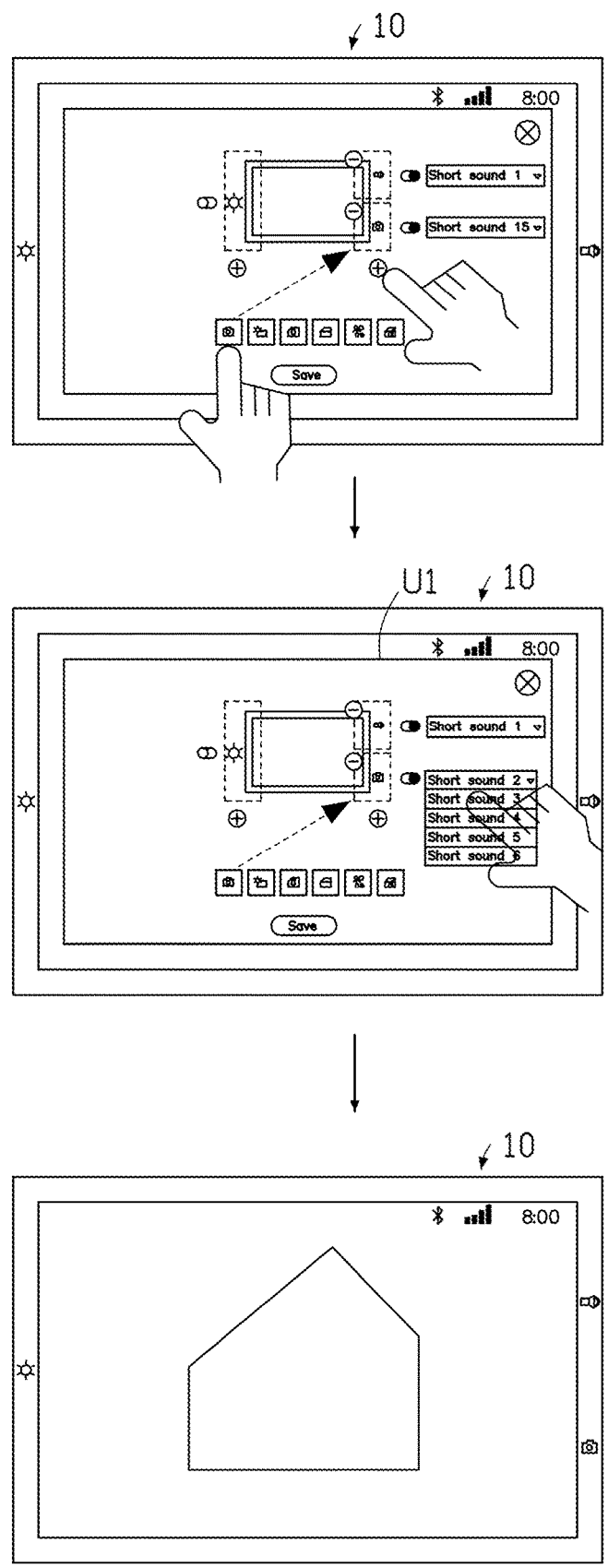

Referring to FIG. 4B, supposing the user expects to set a photo taking function for the added functional area, the user can drag the icon of photo taking function to the added functional area through a finger. The user can also select a prompt tone to represent the photo taking function, the prompt tone corresponding to the photo taking function can be played when the user touches the added functional area, and the user can confirm the functional area being correctly touched even if the user does not look at the functional area. After functional area settings are completed, the user can click a save icon to exit the border function setting interface U1. The right border area contains two sub-border areas, one for adjusting the multimedia volume and the other for taking photos.

Figure 5:
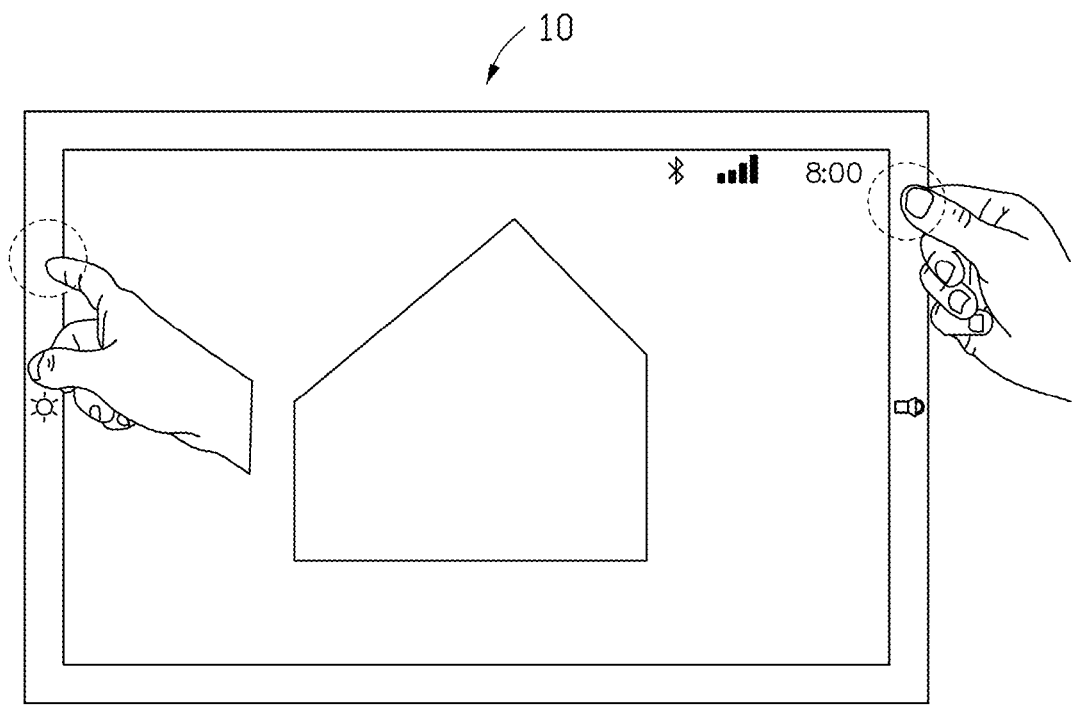
FIG. 5 is an operation diagram of an embodiment of an objective border area of the electronic device according to the present disclosure.

Referring to FIG. 5, the left border area is configured to adjust a screen brightness and the right border area is configured to adjust a multimedia volume as an example. The user can adjust the screen brightness by clicking the left border area or sliding in the left border area, and the user can adjust the multimedia volume by clicking the right border area or sliding in the right border area. For example, the user clicks the upper half of the left border area to increase the screen brightness, and clicks the lower half of the left border area to decrease the screen brightness. The user slides from bottom to top in the left border area to increase the screen brightness, and slides from top to bottom in the left border area to decrease the screen brightness.

For example, the user clicks the upper half of the right border area to increase the multimedia volume, and clicks the lower half of the right border area to decrease the multimedia volume. The user slides from bottom to top in the right border area to increase the multimedia volume, and slides from top to bottom in the right border area to decrease the multimedia volume.

Figure 6:
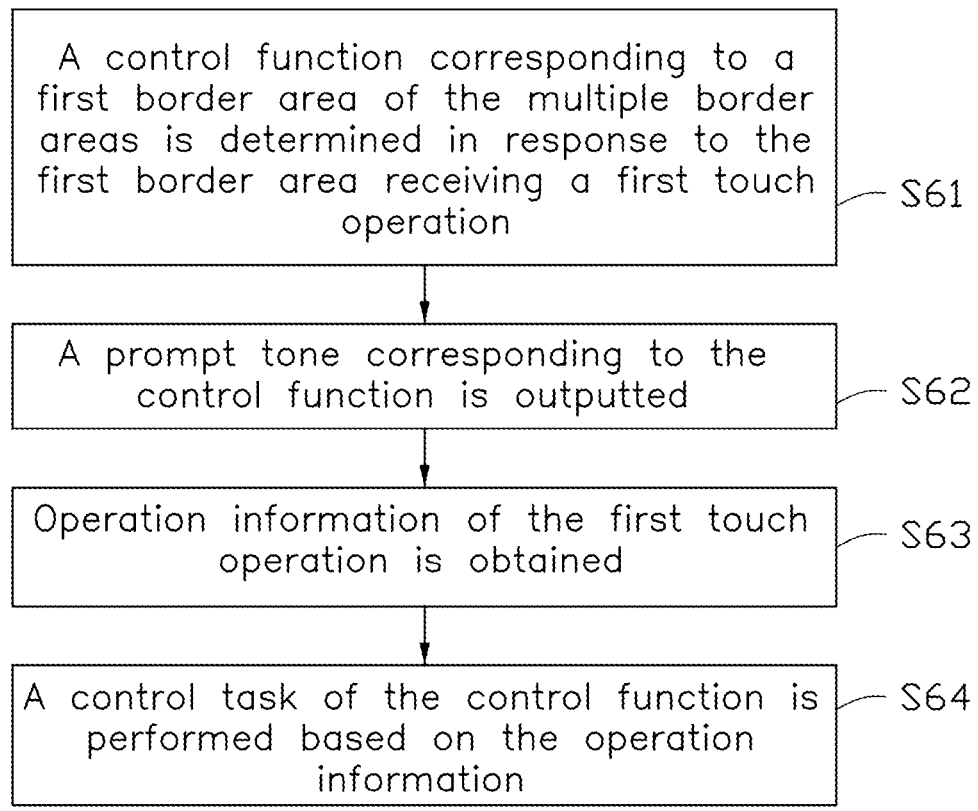
FIG. 6 is a flowchart of an embodiment of the device control method according to the present disclosure.

FIG. 6 illustrates one exemplary embodiment of a device control method. The flowchart presents an exemplary embodiment of the method. The exemplary method is provided by way of example, as there are a variety of ways to carry out the method. Each block shown in FIG. 6 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be operated in an electronic device and begin at block S61.

In block S61, a control function corresponding to a first border area of the multiple border areas is determined in response to the first border area receiving a first touch operation.

In one embodiment, the electronic device comprises a display screen, and the display screen comprises a display area and a border. The border comprises the multiple border areas. For example, the multiple border areas can be selected from a group of an upper border area, a lower border area, a left border area, a right border area, an upper side edge area, a lower side edge area, a left side edge area, and a right side edge area.

In one embodiment, the user can set or adjust the control function corresponding to each border area according to actual requirements, and set or adjust the prompt tone correspond to each control function. For example, the electronic device opens a border function setting interface according to a second touch operation received by the display area (such as clicking a specified icon displayed in the display area). The border function setting interface is configured to set a control function for each border area according to user operations. The user can divide the border area into one or more sub-border areas, each sub-border area corresponds to a control function. The user can also delete one or more sub-border areas to decrease the number of the sub-border areas of the border area.

In one embodiment, the border function setting interface is configured to set a prompt tone for each control function according to user operations.

Supposing the first border area is the left border area of the border, a preset control function corresponding to the left border area is a screen brightness adjustment function, and a prompt tone corresponding to the screen brightness adjustment function is to play a sound of "screen brightness adjustment". When the first border area receives the first touch operation, the electronic device can response the first touch operation to determine the control function corresponding to the first border area. That is, the electronic device can response the first touch operation received by the first border area to determine the control function corresponding to the first border area as the screen brightness adjustment function. The first touch operation can be a clicking operation, a sliding operation, etc.

In block S62, a prompt tone corresponding to the control function is outputted.

In one embodiment, the electronic devices can comprise a sound playback component, such as a speaker. When the control function corresponding to the first border area is determined, the electronic device can output the prompt tone corresponding to the control function. For example, when the control function corresponding to the first border area is determined to the screen brightness adjustment function, and the prompt tone corresponding to the screen brightness adjustment function is to play the sound of "screen brightness adjustment", the electronic device can play the sound of "screen brightness adjustment" after the first border area receives the first touch operation, so that the user can confirm that the border area of the screen brightness adjustment function has been touched even if the user does not look at the central control screen.

In block S63, operation information of the first touch operation is obtained.

In one embodiment, the operation information of the first touch operation may comprise a touch type and/or a touch position. When the control function corresponding to the first border area is determined, the electronic device further obtains the operation information of the first touch operation to determine what control tasks to be performed.

For example, when the control function corresponding to the first border area is the screen brightness adjustment function, a control task of the screen brightness adjustment function may comprise increasing the screen brightness and decreasing the screen brightness. The electronic device can obtain the operation information of the first touch operation to determine whether to increase the screen brightness, or decrease the screen brightness.

For example, when the control function corresponding to the first border area is the photo taking function, the control task of the photo taking function may comprise single shooting and continuous shooting N (a value of N can be set according to actual requirements), and the electronic device can obtain the operation information of the first touch operation to determine whether the control task of the photo taking function is a single shooting or a continuous shooting.

In one embodiment, the touch type may comprise a click operation and a sliding operation, and the touch position may comprise a starting touch position and a off-hand touch position.

In block S64, a control task of the control function is performed based on the operation information.

In one embodiment, taking the first touch operation as the click operation an example, the electronic device can perform the control task of the control function based on a click position of the click operation in the first border area. For example, the control function corresponding to the first border area is the screen brightness adjustment function, if the upper half of the first border area receives the click operation, the electronic device increases the screen brightness by one grid. If the lower half of the first border area receives the click operation, the electronic device decreases the screen brightness by one grid.

Taking the first touch operation as the sliding operation an example, the electronic device can obtain a starting touch position and a off-hand touch position of the sliding operation to determine a sliding direction of the sliding operation in the first border area. The electronic device can further perform the control task of the control function based on the sliding direction of the sliding operation in the first border area. For example, the control function corresponding to the first border area is the screen brightness adjustment function, if the first border area receives the sliding operation from bottom to top, the electronic device increases the screen brightness. If the first border area receives the sliding operation from top to bottom, the electronic device decreases the screen brightness. An adjusting degree of the screen brightness can be related to a sliding distance of the sliding operation.

In one embodiment, the clicking operation and the sliding operation can also be set to correspond to a control task respectively. For example, taking the control function corresponding to the first border area as the photo taking function, the control task corresponding to the clicking operation is the single shooting, and the control task corresponding to the sliding operation is the continuous shooting.

In one embodiment, when the first border area comprises two or more sub-border areas and the touch type is the sliding operation, it may exist a problem that the sliding operation of the user intrudes two or more sub-border areas. The electronic device can obtain a starting touch position of the sliding operation and determine a sub-border area where the starting touch position of the sliding operation is located as an objective sub-border area. The electronic device can perform the control task corresponding to the control function of the objective sub-border area to overcome the above problem.

For example, the first border area from top to bottom comprises a sub-border area A, a sub-border area B, and a sub-border area C. Supposing the sliding operation of the user starts at the sub-border area A and the finger does not leave the first border area during the sliding operation, even if the finger slides form the sub-border area A to the sub-border area B, or slides form the sub-border area A to the sub-border area C, the electronic device only performs the control function corresponding to the sub-border area A, achieving to accurately control the electronic device based on the sliding operation of the user.

Figure 7:
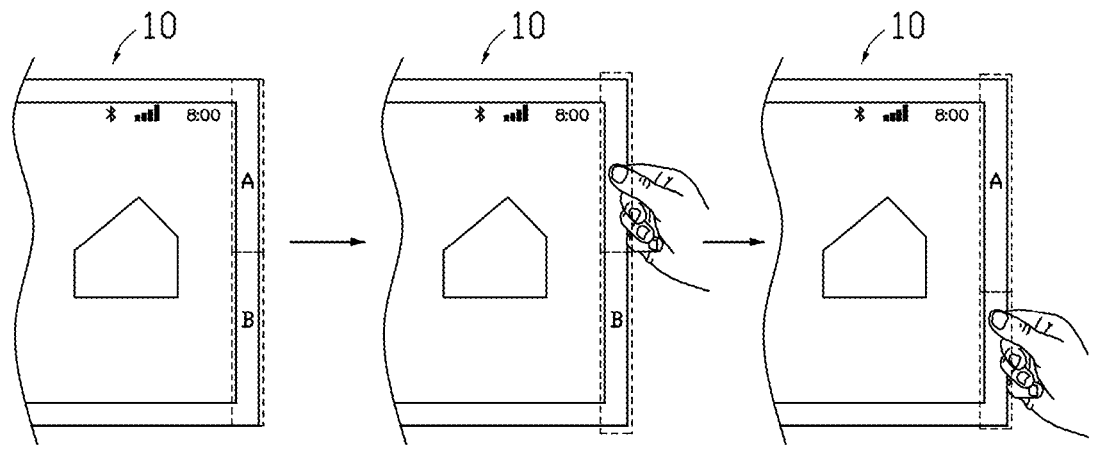
FIG. 7 is an operation diagram of an embodiment of an objective border area with two sub-border areas of the electronic device according to the present disclosure.

Referring to FIG. 7, supposing the right border area comprises a sub-border area A and a sub-border area B, the user slides in the right border area, the starting touch position is located in the sub-border area A and the finger does not leave the right border area during this sliding operation, an excessive sliding of the user intrudes the sub-border area B, the electronic device only performs the control function corresponding to the sub-border area A.

In one embodiment, the electronic device may also perform the control task corresponding to the control function of the objective sub-border area based on a sliding direction of the sliding operation. For example, the electronic device obtains a off-hand touch position of the sliding operation, and determines the sliding direction of the sliding operation in the first border area based on the starting touch position and off-hand touch position of the sliding operation. The electronic device further performs the control task corresponding to the control function of the objective sub-border area based on the sliding direction of the sliding operation in the first border area.

The device control method uses the border of the electronic device as the "touch button", the border can be customized the control function and prompt tone, to achieve an effect that the user can blindly operate the electronic device, which increases a convenience of the operation of the electronic device and reduces a risk caused by a distraction operation screen of the user.

Based on the same idea as the device control method of the above embodiments, the present application also provides a control device, which may be configured to perform the device control method.

Figure 8:
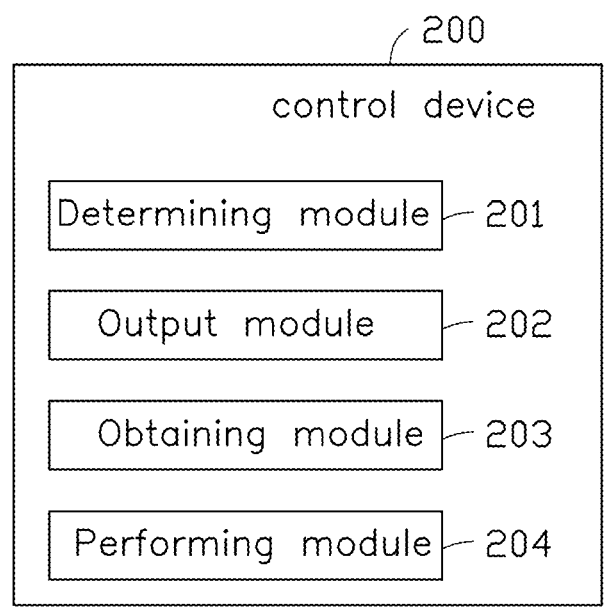
FIG. 8 is a block diagram of an embodiment of a control device according to the present disclosure.

Referring to FIG. 8, the control device 200 may comprise a plurality of modules, such as a determining module 201, an output module 202, an obtaining module 203, and a performing module 204. The modules 201204 can comprise one or more software programs in the form of computerized codes stored in a non-transitory storage medium. The computerized codes can include instructions that can be executed by a processor to provide functions for the modules 201-204. The control device 200 can be integrated into the electronic device. The electronic device comprises a display screen, and the display screen comprises a display area and a border. The border comprises multiple border areas.

The determining module 201 is configured to determine a control function corresponding to a first border area of the multiple border areas in response to the first border area receiving a first touch operation.

The output module 202 is configured to output a prompt tone corresponding to the control function.

The obtaining module 203 is configured to obtain operation information of the first touch operation, and the operation information of the first touch operation may comprise a touch type and/or a touch position.

The performing module 204 is configured to perform a control task of the control function based on the operation information.

Figure 9:
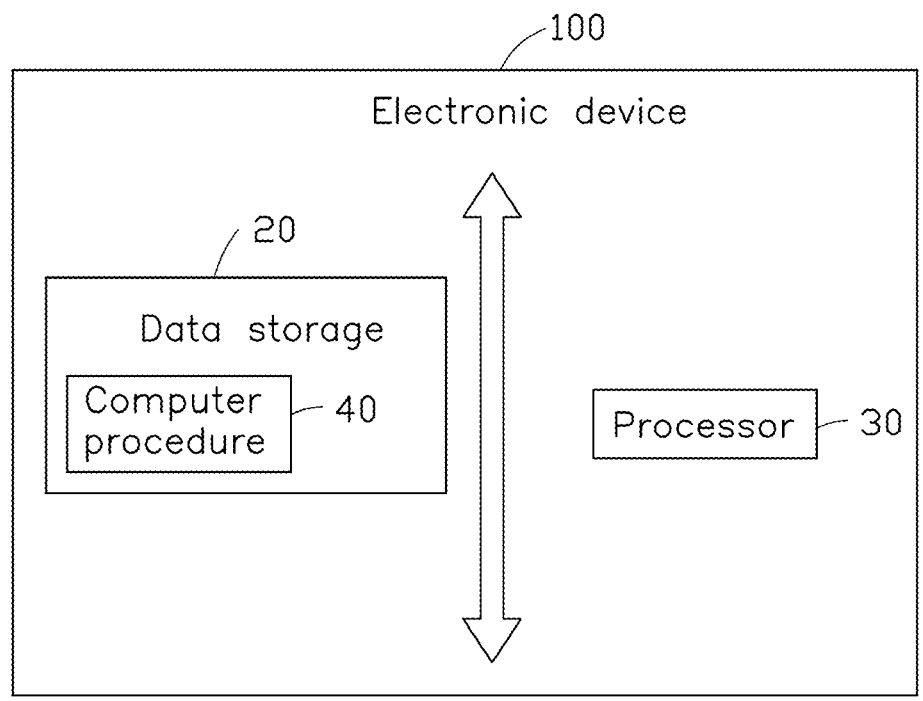
FIG. 9 is a schematic structural diagram of an embodiment of the electronic device according to the present disclosure.

Referring to FIG. 9, the electronic device 100 can comprise at least one data storage 20, at least one processor 30, and a computer procedure 40. The computer procedure 40 can be stored in the data storage 20 and can be executed by the processor 30. The processor 30 executes the computer procedure 40 for implementing the device control method of the above embodiments.

In one embodiment, the computer procedure 40 can be divided into multiple modules, such as the determining module 201, the output module 202, the obtaining module 203, and the performing module 204 as shown in FIG. 8.

In one embodiment, the data storage 20 can be set in the electronic device 100, or can be a separate external memory card, such as an SM card (Smart Media Card), an SD card (Secure Digital Card), or the like. The data storage 20 can include various types of non-transitory computer-readable storage mediums. For example, the data storage 20 can be an internal storage system, such as a flash memory, a random access memory (RAM) for the temporary storage of information, and/or a read-only memory (ROM) for permanent storage of information. The data storage 20 can also be an external storage system, such as a hard disk, a storage card, or a data storage medium. The processor 30 can be a central processing unit (CPU), a microprocessor, or other data processor chip that achieves the required functions.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A method for controlling an electronic device, the electronic device includes a display screen, the display screen includes a display area and a border, and the border includes multiple border areas, wherein the multiple border areas include front areas of the border and side edge areas of the border, the method comprising:
    determining a control function corresponding to a first border area of the multiple border areas in response to the first border area receiving a first touch operation;
    outputting a prompt tone corresponding to the control function;
    obtaining operation information of the first touch operation, wherein the operation information of the first touch operation includes a touch type and a touch position;
    performing a control task of the control function based on the operation information, wherein a control function corresponding to a first border area or sub-border area at a starting touch position of the first touch operation is performed even when an ending touch position of the first touch operation enters into a second border area or sub-border area;
    opening a border function setting interface in response to the display area receiving a second touch operation, wherein the border function setting interface is configured to set a control function of each of the multiple border areas;
    customizing, using the border function setting interface, an amount of sub-border areas of the multiple border areas, wherein each of the multiple border areas is divided into one or more of the sub-border areas, and each of the one or more sub-border areas corresponds to one control function; and
    setting, using the border function setting interface, a prompt tone corresponding to the control function of each of the multiple border areas and the control function of each of the one or more of the sub-border areas.

2. The method of claim 1, wherein the touch type includes a click operation, and performing the control task of the control function based on the operation information further comprises:
    performing the control task of the control function based on a click position of the click operation in the first border area.

3. The method of claim 1, wherein the touch type includes a sliding operation, and performing the control task of the control function based on the operation information further comprises:
    obtaining a starting touch position and an ending touch position of the sliding operation to determine a sliding direction of the sliding operation in the first border area, and performing the control task of the control function based on the sliding direction of the sliding operation in the first border area.

4. The method of claim 1, wherein the touch type includes a sliding operation, the first border area includes multiple sub-border areas, each of the multiple sub-border areas corresponds to one control function, and performing the control task of the control function based on the operation information further comprises:

obtaining a starting touch position of the sliding operation and determining one of the multiple sub-border areas where the starting touch position of the sliding operation is located as an objective sub-border area, and performing the control task corresponding to the control function of the objective sub-border area.

5. The method of claim 4, wherein performing the control task corresponding to the control function of the objective sub-border area further comprises:

obtaining an ending touch position of the sliding operation and determining a sliding direction of the sliding operation in the first border area based on the starting touch position and the ending touch position of the sliding operation, and performing the control task corresponding to the control function of the objective sub-border area based on the sliding direction of the sliding operation in the first border area.

6. An electronic device comprising:

a display screen, the display screen comprising a display area and a border, and the border comprising multiple border areas, wherein the multiple border areas include front areas of the border and side edge areas of the border;

at least one processor;

and a data storage storing one or more programs which when executed by the at least one processor, cause the at least one processor to:

determine a control function corresponding to a first border area of the multiple border areas in response to the first border area receiving a first touch operation;

output a prompt tone corresponding to the control function;

obtain operation information of the first touch operation, wherein the operation information of the first touch operation comprises a touch type and/or a touch position;

perform a control task of the control function based on the operation information, wherein a control function corresponding to a first border area or sub-border area at a starting touch position of the first touch operation is performed even when an ending touch position of the first touch operation enters into a second border area or sub-border area;

open a border function setting interface in response to the display area receiving a second touch operation, wherein the border function setting interface is configured to set a control function of each of the multiple border areas;

customize, using the border function setting interface, an amount of sub-border areas of the multiple border areas, wherein each of the multiple border areas is divided into one or more of the sub-border areas, and each of the one or more sub-border areas corresponds to one control function; and set, using the border function setting interface, a prompt tone corresponding to the control function of each of the multiple border areas and the control function of each of the one or more of the sub-border areas.

7. The electronic device of claim 6, wherein the touch type comprises a click operation, the at least one processor, is configured to perform the control task of the control function based on the operation information, is further configured to:

perform the control task of the control function based on a click position of the click operation in the first border area.

8. The electronic device of claim 6, wherein the touch type comprises a sliding operation, the at least one processor, is configured to perform the control task of the control function based on the operation information, is further configured to:

obtain a starting touch position and an ending touch position of the sliding operation to determine a sliding direction of the sliding operation in the first border area, and perform the control task of the control function based on the sliding direction of the sliding operation in the first border area.

9. The electronic device of claim 6, wherein the touch type comprises a sliding operation, the first border area comprises multiple sub-border areas, each of the multiple sub-border areas corresponds to one control function, the at least one processor, is configured to perform the control task of the control function based on the operation information, is further configured to:

obtain a starting touch position of the sliding operation and determine one of the multiple sub-border areas where the starting touch position of the sliding operation is located as an objective sub-border area, and perform the control task corresponding to the control function of the objective sub-border area.

10. The electronic device of claim 9, wherein the at least one processor, is configured to perform the control task corresponding to the control function of the objective sub-border area, is further configured to:

obtain an ending touch position of the sliding operation and determine a sliding direction of the sliding operation in the first border area based on the starting touch position and the ending touch position of the sliding operation, and perform the control task corresponding to the control function of the objective sub-border area based on the sliding direction of the sliding operation in the first border area.

11. A non-transitory storage medium having stored thereon instructions that, when executed by a processor of an electronic device, cause the electronic device to perform a method for controlling the electronic device, the electronic device comprising a display screen, the display screen comprising a display area and a border, and the border comprising multiple border areas, wherein the multiple border areas include front areas of the border and side edge areas of the border, the method comprising:

determining a control function corresponding to a first border area of the multiple border areas in response to the first border area receiving a first touch operation;

outputting a prompt tone corresponding to the control function;

obtaining operation information of the first touch operation, wherein the operation information of the first touch operation comprises a touch type and/or a touch position;

performing a control task of the control function based on the operation information, wherein a control function corresponding to a first border area or sub-border area at a starting touch position of the first touch operation is performed even when an ending touch position of the first touch operation enters into a second border area or sub-border area;

opening a border function setting interface in response to the display area receiving a second touch operation, wherein the border function setting interface is configured to set a control function of each of the multiple border areas;

customizing, using the border function setting interface, an amount of sub-border areas of the multiple border areas, wherein each of the multiple border areas is divided into one or more of the sub-border areas, and each of the one or more sub-border areas corresponds to one control function; and setting, using the border function setting interface, a prompt tone corresponding to the control function of each of the multiple border areas and the control function of each of the one or more of the sub-border areas.

* * * * *